Figure 1:
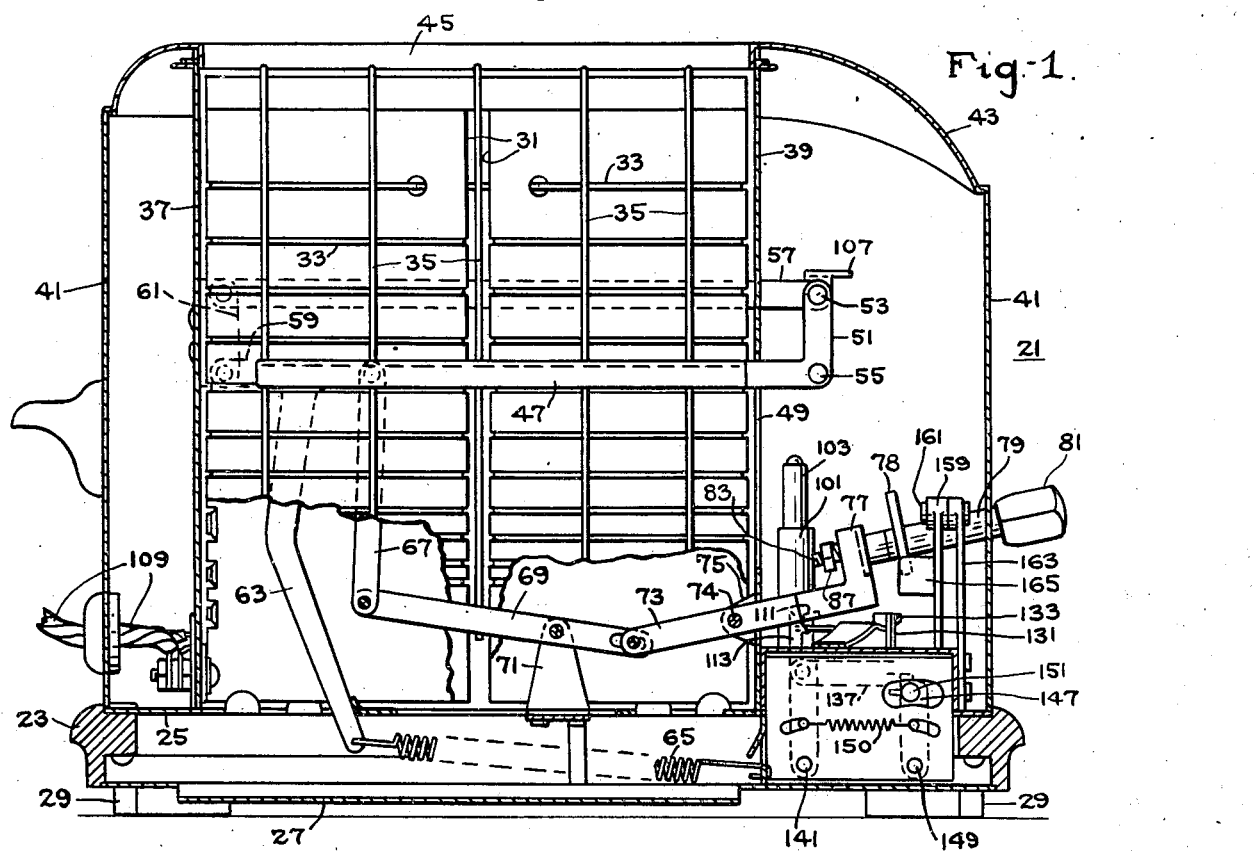

Dec. 16, 1941.  M. IRELAND  2,266,045
AUTOMATIC TOASTER
Filed Sept. 27, 1940  4 Sheets-Sheet 1

Inventor:
Murray Ireland
By N. M. Biebel
Attorney

Dec. 16, 1941.    M. IRELAND    2,266,045
AUTOMATIC TOASTER
Filed Sept. 27, 1940    4 Sheets-Sheet 2

Inventor:
Murray Ireland.
By H. M. Biebel
Attorney.

Dec. 16, 1941.  M. IRELAND  2,266,045
AUTOMATIC TOASTER
Filed Sept. 27, 1940   4 Sheets—Sheet 3

Inventor:
Murray Ireland.
By H. M. Biebel
Attorney.

Dec. 16, 1941.    M. IRELAND    2,266,045
AUTOMATIC TOASTER
Filed Sept. 27, 1940    4 Sheets-Sheet 4
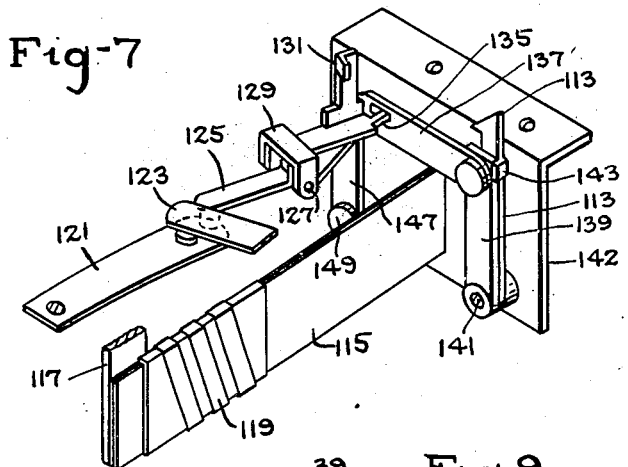
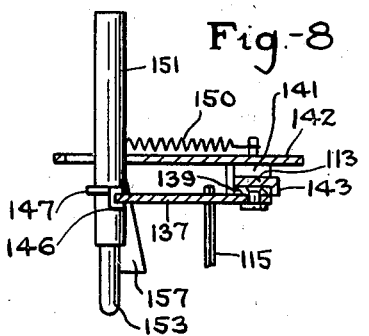
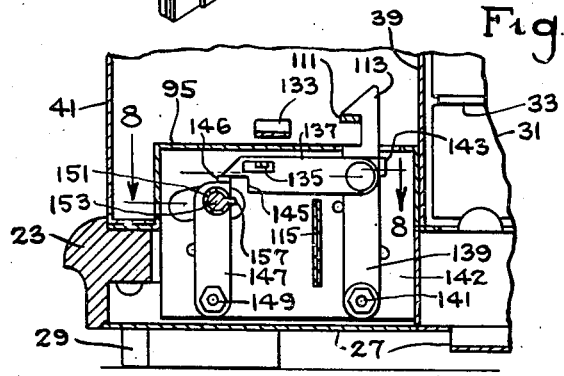
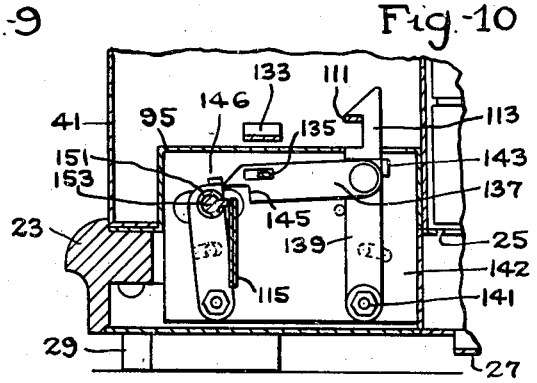
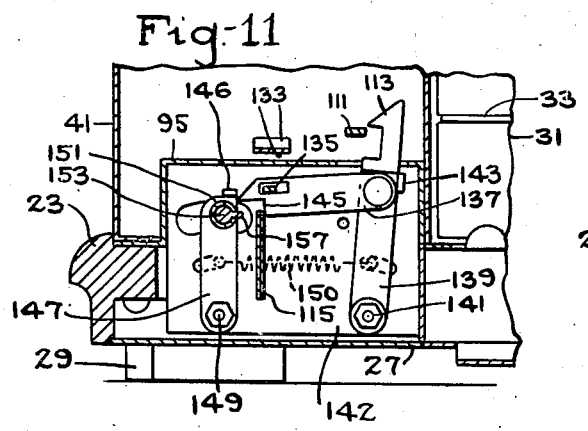
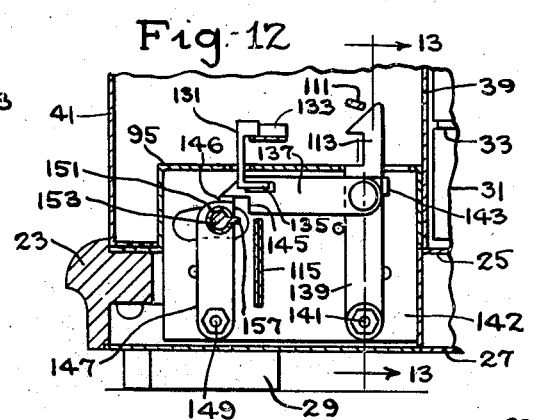
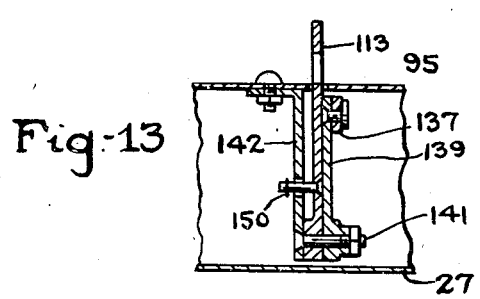
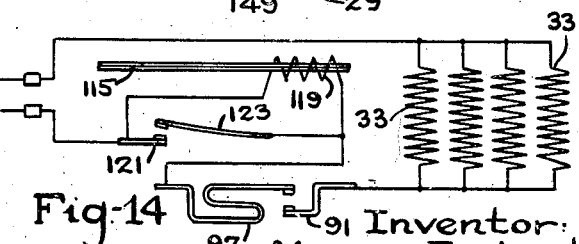
Inventor:
Murray Ireland
By H. M. Biebel
Attorney.

Patented Dec. 16, 1941

2,266,045

UNITED STATES PATENT OFFICE 2,266,045

AUTOMATIC TOASTER

Murray Ireland, near Elgin, Ill., assignor to McGraw Electric Company, Elgin, Ill., a corporation of Delaware Application September 27, 1940, Serial No. 358,624

4 Claims. (Cl. 219—19)

My invention relates to automatic electric cooking devices and particularly to electric toasters.

An object of my invention is to provide a simplified means for initiating a toasting operation and for varying the duration thereof.

Another object of my invention is to provide a single manually actuable means for causing closing of a control switch and movement of a bread carrier into toasting position and for preselecting the duration of a toasting operation.

Another object of my invention is to provide a single manually actuable knob movable by an operator in one direction to initiate a toasting operation and then movable by the operator in another direction to vary the duration of operation of the timer.

Still another object of my invention is to use a single means to initiate a toasting operation and to vary the duration of one of the cycles of a thermal timer operable on a heat-up cool-off cycle to thereby vary the duration of a toasting operation.

Figure 2:
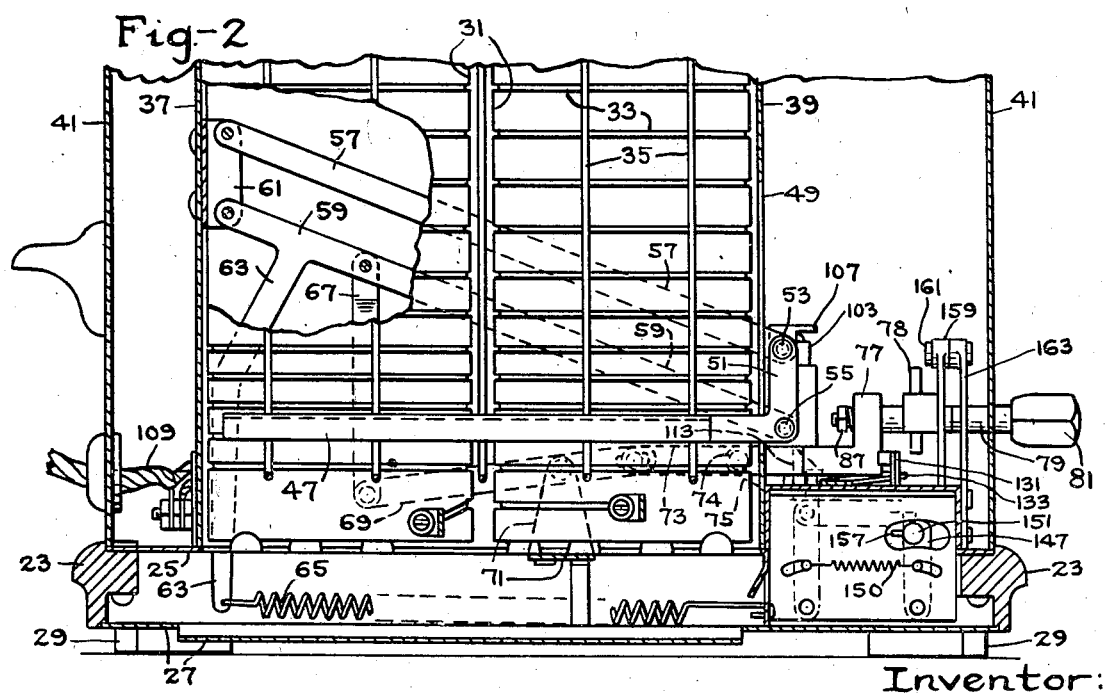
Figure 3:
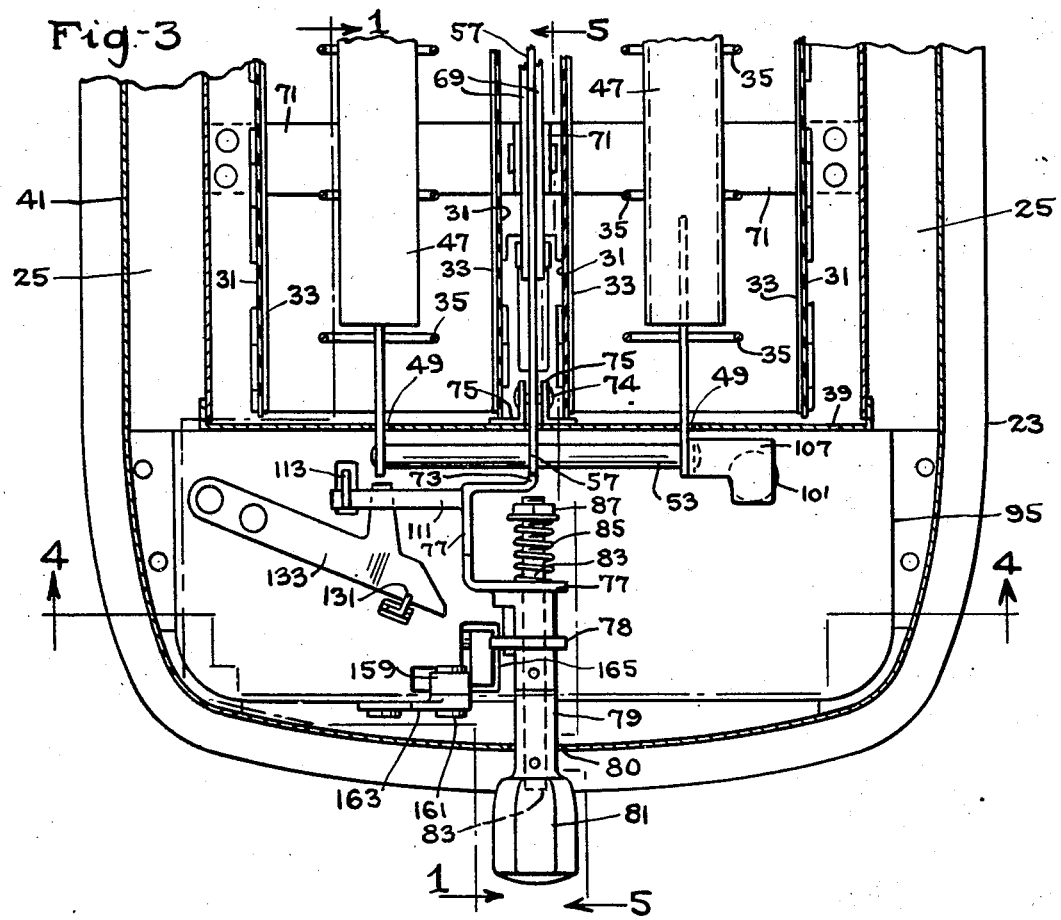
Figure 4:
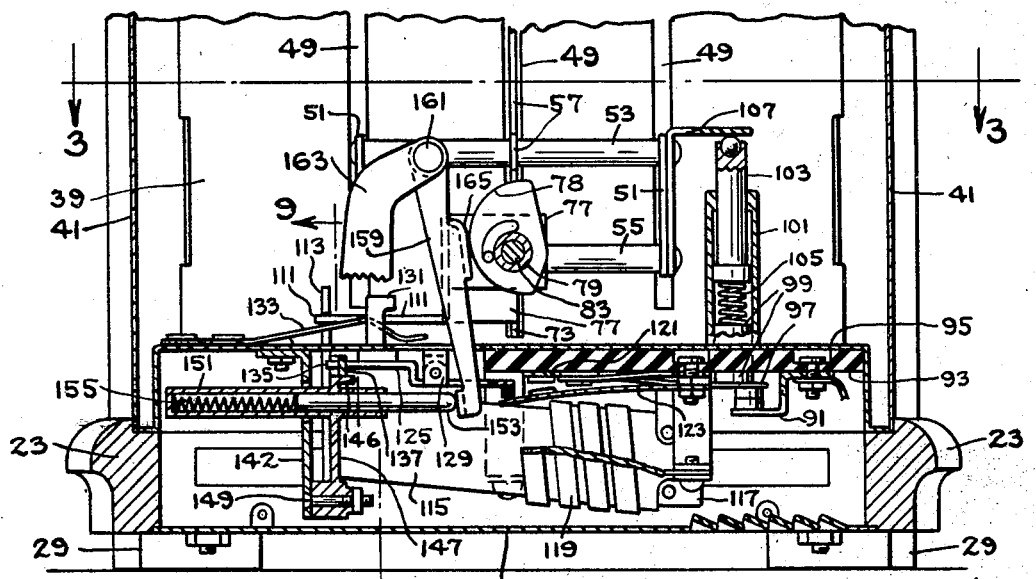
Figure 5:
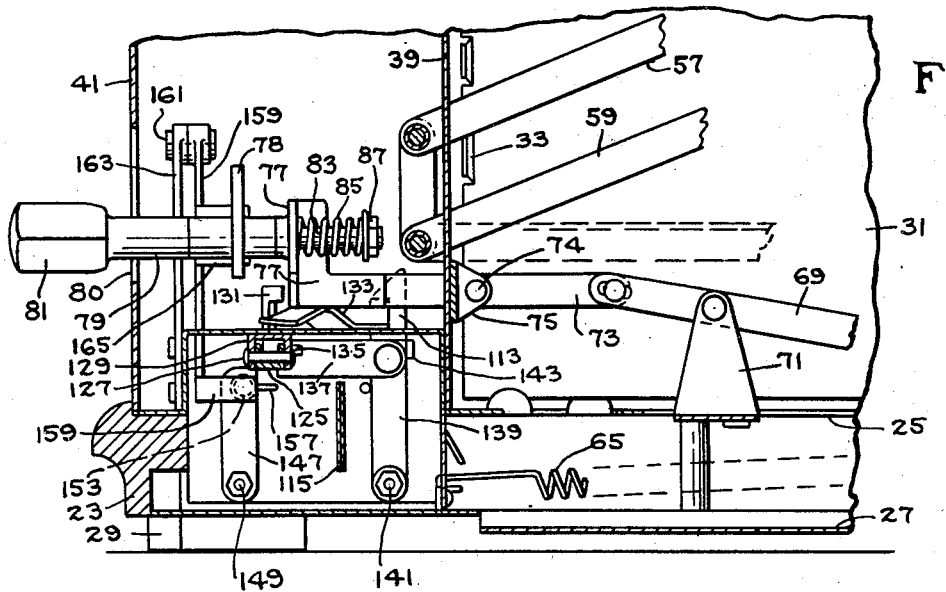
Figure 6:
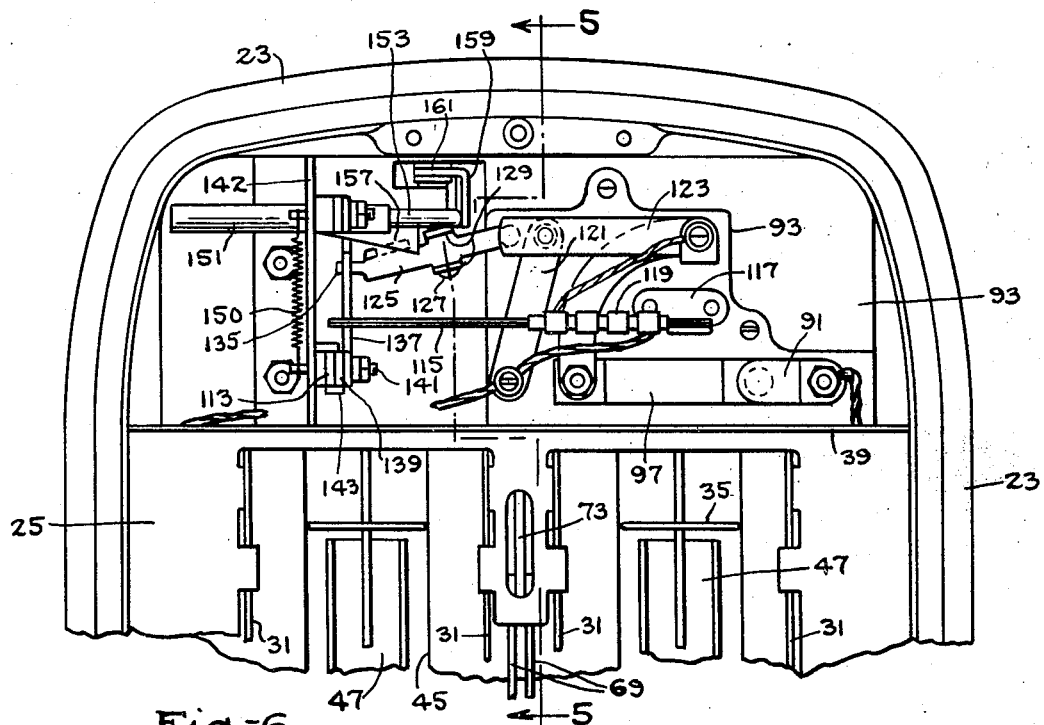

In the drawings,

Figure 1 is a central vertical sectional view taken approximately on the line 1—1 of Fig. 3, the parts being shown in inoperative or non-toasting positions, Fig. 2 is a fragmentary view similar to Fig. 1 but without the uppermost part of the toaster being shown, and the parts being shown in toasting positions, Fig. 3 is a fragmentary horizontal sectional view showing the front portion of the toaster and taken on the line 3—3 of Fig. 4, the parts being shown in toasting position, Fig. 4 is a front elevational sectional view taken on the line 4—4 of Fig. 3, the parts being shown in toasting position and the upper part of the toaster being omitted, Fig. 5 is a vertical sectional view thereof taken on the line 5—5 of Figs. 3 and 6, the parts being shown in toasting positions, Fig. 6 is a fragmentary bottom plan view showing the front portion of the toaster and certain parts thereof removed, Fig. 7 is a perspective view showing certain parts of the thermal timer in non-operating positions, Fig. 8 is a fragmentary sectional view taken on the line 8—8 of Fig. 9 showing certain parts of the thermal timing means, Figs. 9, 10, 11 and 12 are fragmentary sectional views taken on the line 9—9 of Fig. 4 showing parts of the thermal timing means in various positions during the heat-up cool-off cycle of the thermal bar, Fig. 13 is a fragmentary sectional view taken on the line 13—13 of Fig. 12, and, Fig. 14 is a wiring diagram showing the electrical connections and circuits of the toaster.

I have elected to show my invention as associated with a multi-slice toaster 21 which toaster comprises a moulded composition skeleton base frame 23 which has mounted thereon adjacent to its upper surface a base or bottom plate 25 which may be of thin sheet metal. I provide also a crumb tray 27 which may be suitably secured in any desired manner against the lower surface portion of frame 23. The frame 23 may be provided with supporting feet 29, all in a manner well known in the art. I have elected to show a two-slice toaster and I therefore provide two pairs of spaced-apart toast heating elements each including one or more plates 31 of thin sheet electric-insulating material such as mica, which have mounted thereon and supported thereby a heating resistor 33, all in a manner well known in the art. As will be noted by reference to Fig. 3 of the drawings, I provide four such electric toast heating elements and reference may be had to my issued Patent No. 2,001,362 for the details of construction and of holding of these heating elements. I provide further a plurality of guard and guide wires 35 to ensure that a slice of bread being toasted between the pair of spaced toast heating elements will be held properly positioned therebetween so that uniform toasting of both sides of the slice of bread may be effected.

I provide a rear intermediate wall 37, a front intermediate wall 39, as well as an outer casing 41 which outer casing comprises two side walls and front and rear walls. I provide further a cover member 43 which cover member is provided with a number of bread-insertion openings 45 therein located substantially centrally of the spaced pairs of toast heating elements so that slices of bread may be inserted into the toasting chambers and the toasted slices of bread may be removed therefrom at the end of a toasting operation.

I provide further one or more bread carriers 47 having a front end portion extending through a slot 49 in the front intermediate wall 39, the front end portion ending in a short vertical part 51. In the case of a two-slice toaster the two spaced members 51 are pivotally secured to an upper cross bar 53 and a lower cross bar 55 (see Figs. 2, 4 and 5). The upper cross bar 53 is pivotally connected at its mid-portion with an upper link 57 while the lower cross bar 55 is pivotally connected with a lower link 59, the rear ends of these two links being pivotally mounted on a bracket 61 which is secured to the front surface of the rear intermediate wall 37. The two links 57 and 59 connected as just above described provide a parallel motion device for the bread carrier or carriers 47. In order to effect movement of the bread carriers 47 downwardly the lower link 59 is provided with a depending arm 63 constituting an integral part of link 59 adjacent to its rear end and in order to bias the bread carriers to their upper, non-toasting position, a biasing spring 65 has one end thereof connected to the lower end of arm 63 while its other end may be connected to some fixed part of the toaster structure in a manner well known in the art.

Means for effecting manually-actuable downward movement of the bread carriers from the position shown in Fig. 1 to the position shown in Fig. 2 may include a link bar 67 pivotally connected to the lower link 59 in front of the bar or arm 63 and depending therefrom. The lower end of member 67 is pivotally connected to a lever arm 69 which is pivotally mounted on a bracket 71 and which has its front end provided with an elongated slot to receive a pin fixed in one end of an actuating lever arm 73 which is pivotally mounted at 74 intermediate its ends on a bracket 75 which is secured to the inside surface of front intermediate wall 39. The forward end of lever 73 is provided with a U-shaped extension 77 for the purpose of providing a bearing and support for a shaft 83. The forward end of said shaft beyond said extension 77 has secured thereto a cam member 78 and a hub member 79, said hub extending outwardly through an elongated opening 80 in the front wall of the outer casing 41, and has fixed thereon outside of said casing an actuating knob 81. The rearward end of said shaft 83 being threaded, telescopes and supports a compression spring 85, the one end of which engages the rear face of the bearing portion on extension 77, its other end being engaged by a nut 87, which is drawn up on said shaft 83, a suitable distance against said spring to cause it to be held under a suitable compression. Said spring provides a means to prevent said shaft 83 and cam 78 from rotating except when said shaft is manually operated through the turning movement of knob 81, and while said knob is held in a fixed position relative to its turning movement, it can be moved approximately vertically on the pivot pin 74 of lever arm 73. The purpose of the cam 78 will hereinafter be described.

Means for controlling the energization of the toast heating elements may comprise a contact bar 91 which is substantially fixedly secured to a block 93 of electric insulating material secured against the under surface of a small casing 95, as well as a resilient contact bar 97 normally yieldingly biased out of engagement with the fixed contact bar 91 as shown in the wiring diagram of Fig. 14. Means for moving contact bar 97 into engagement with contact 91 may include a lower actuating rod 99 movable in a tubular guide member 101. An upper actuating rod 103 is movable in tubular member 101 against a compression spring 105 and rod 103 may be engaged by an L-shaped bracket 107 which may be secured against one of the members 51 hereinbefore described and shown more particularly in Fig. 4 of the drawings. The usual twin conductor cord 109 is provided in a manner well known in the art to permit of connecting the electric circuits of the toaster to a suitable electric supply circuit.

It is evident that when knob 81 is moved from the position shown in Fig. 1 downwardly to the position shown in Fig. 2, the bread carriers will be moved from their upper non-toasting position to their lower toasting position and further as also shown in Fig. 4, the members 91 and 97 of the control switch for the toast heating elements and other electric circuits of the toaster will be closed and energized. It may also be pointed out that the vertical movement of the knob 81 is considerably less than the vertical movement of the bread carriers during the movement of the bread carriers from non-toasting to toasting position, or vice versa.

In order to hold the switch closed and the bread carriers in their lowered or toasting positions, member 77 is provided with a laterally projecting bar 111 (see Fig. 3) which projecting bar is adapted to move under and be engaged by the upper hook-shaped end of a detent arm 113.

A thermal timing means is positioned within the small casing 95 and includes a thermobar 115 having one end thereof fixedly supported on a bracket 117 which bracket may be secured against plate 93 hereinbefore described. An auxiliary electric heating resistor 119 is insulatedly mounted on and supported by the bimetal bar 115, the connections of this auxiliary thermobar heating element being shown in Fig. 14 of the drawings. It will be noted that auxiliary heater 119 is energized as soon as knob 81 has been moved downwardly to initiate a toasting operation and this heating of the bimetal bar 115 will be continued for a predetermined time and then terminated in a manner to be described to cause cooling of the bimetal bar thereafter. In other words, it is pointed out that the thermal timing means shown in these drawings operates on the heat-up cool-off cycle or principle.

Control of the energization of the auxiliary heater 119 is effected by a substantially rigid contact bar 121 and a resilient contact bar 123 the latter bar being normally biased out of engagement with bar 121 by a double arm lever 125 pivotally mounted intermediate its ends on a pivot pin 127 which pivot pin is supported by a bracket 129. Lever arm 125 is provided with an upwardly-extending projection 131 of substantially L-shape (see Figs. 4 and 5) and member 131 is normally engaged by a biasing spring 133 to hold member 131 in its upper position where the end of lever 125 engaging resilient contact bar 123 presses the same out of contacting engagement with contact arm 121. It is to be noted that biasing spring 133 is moved out of engagement with member 131 by member 111 when arm 73 and member 77 have been moved to their lower positions, to allow turning movement of lever 125 after the thermobar 115 has completed its heat-up period or cycle, thus causing a new electric circuit to be completed through contacts 121 and 123, which will shunt out resistor 119, thereby allowing the thermobar 115 to complete its cool-off cycle after which the movable parts of the toaster will move to non-toasting position.

One end portion 135 of lever arm 125 is adapted to fit into a slot in an arm 137 near its outer end, which arm has its other end pivotally mounted on a bar 139, the lower end of bar 139 being pivotally mounted on a pivot pin 141 supported by a bracket 142 as will be seen particularly from Fig. 7. Arm 139 extends closely adjacent to detent arm 113 hereinbefore described and it may be noted that detent arm 113 is provided with a laterally-extending lug 143 for a purpose which will hereinafter appear. The outer end of arm 137 is provided with a shouldered recess 145 and this end of arm 137 is normally adapted to rest upon a lateral projection 146 of bar 147 which extends substantially vertically upwardly from a pivot pin 149. A biasing spring 150 is connected to arm 139 and arm 147 to yieldingly bias them toward each other.

The upper end of arm 147 has mounted thereon and extending laterally thereof a tubular casing 151 in which a stop member 153 may slide, this stop member being normally yieldingly biased into a given direction by a compression spring 155 as may be seen particularly from Fig. 4 of the drawings. Suitable stop means for limiting the outward movement of member 153 may be provided in any desired manner. Reference to Fig. 6 of the drawings will show that member 153 is provided with a cam surface 157 and a particular point on this inclined surface is engageable by the free end of heated thermobar 115, as will be hereinafter set forth.

When the auxiliary heater 119 is energized, as hereinbefore set forth, and the thermobar 115 is heated it will flex in a clockwise direction as seen in Fig. 6 of the drawings and will flex in a left-hand direction, as seen in Figs. 9 to 12 inclusive, until its free end engages a point on the variably positionable surface of member 157 whereby to cause turning movement of arm 147 in a counter-clockwise direction (as seen in Figs. 9 to 12) so that arm 137 may be disengaged from projection 146 and be moved downwardly from the position shown in Fig. 9 of the drawings to the position shown in Fig. 10 of the drawings so that the lower edge of shoulder 145 of arm 137 will be in the path of the return movement of bimetal bar 115. This downward movement of the free end of arm 137 is of course effected because of the resilient arm 123 engaging one end of arm 125 while the projection 135 at the other end of arm 125 engages arm 137. When arm 137 turns it permits arm 125 to turn to cause engagement of contact arms 123 and 121 to thereby short-circuit the auxiliary heater 119 with consequent cooling of the bimetal bar 115.

Continued cooling of the thermobar 115 will result in engagement thereof with the shoulder 145 (see Fig. 11) finally causing turning movement of arm 139 and resultant turning movement of arm 113 in a clockwise direction to thereby disengage the upper hooked end of arm 113 from member 111 thereby permitting quick upward movement of the bread carriers into nontoasting position and attendant opening of the circuit of the toast heating elements by reason of the action of biasing spring 65.

I have illustrated and described in some detail the elements of the thermal timing means but I wish to here point out that no claim is made in this application to the particular details of construction of the thermal timing means since they are disclosed and claimed in application Ser. No. 326,576 filed March 29, 1940 by John R. Gomersall and assigned to the same assignee as is the present application. Reference may be had to the copending Gomersall application above identified for further details of construction and method of operation of the thermal timer.

Heretofore the manually actuable means for initiating a toasting operation effective either to close a control switch for the toast heating elements or to move the bread carriers into toasting position or to do both, comprised one member, as, for instance, a manually actuable knob such as the knob 81 hereinbefore described. If it was desired to vary the duration of operation of the timing means a separate manually actuable knob was provided which was supported by the skeleton frame 23 or its equivalent in other toaster structures, but my invention provides a single means for not only initiating a toasting operation by moving the bread carriers into toasting position and/or closing the control switch for the toast heating elements but also to vary the duration of a toasting operation as determined by the thermal timing means.

To this end member 153 is adapted to be engaged by the free end of a lever arm 159, one end of which is pivotally mounted on a pivot pin 161 carried by an upwardly-extending bar or bracket 163, the lower end of which may be suitably secured either on the upper part of casing 95 or against the front wall of the casing 95, as will be noted by reference to Fig. 5. Arm 159 is provided with a laterally-extending plate portion 165 which plate is adapted to be engaged by cam member 78 when the same is turned by turning movement of knob 81. It will, of course, be noted that knob 81 must be moved to its lower position as shown in Fig. 2 of the drawings, before turning movement thereof will cause cam member 78 to engage and mechanically move arm 159 in a clockwise direction to effect movement of rod 153 into the tubular member 151 to thereby vary the point of cam member 157 which is engaged by the end of heated thermobar 115 as hereinbefore described. It is obvious that when the position of the member 153 and of its associated cam surface 157 is as shown in Fig. 6 of the drawings, thermobar 115 must be heated to a higher temperature before the hereinbefore described turning movement of arm 147 will be effected to cause deenergization of the auxiliary heater 119 than would be the case if member 153 and cam surface 157 had been moved in a left-hand direction in Fig. 6 of the drawings.

Spring 85 is effective to frictionally hold knob 81 and cam 78 in any manually adjusted position to thereby ensure that arm 159 will remain in the position to which it has been moved after downward movement of the knob 81 and turning movement thereof in a clockwise direction to change the duration of a toasting operation determined by the thermal timer.

It is thus evident that proper turning movement of knob 81 with resultant turning movement of cam 78 into engagement with and turning of arm 159 will result in decrease of the duration of the heat-up portion of the cycle of the thermal timing means with resultant decrease in the duration of a toasting operation.

The device embodying my invention therefore provides a single manually actuable means operative in predetermined sequence to mechanically cause a variation in the position of a stop member comprising a part of the thermal timing means whereby to vary the duration of a toasting operation.

While I have illustrated and described a specific embodiment of my invention it is obvious that modifications may be made therein and all modifications clearly coming within the scope of the appended claims are to be considered as being covered thereby.

I claim as my invention:

1. In an automatic electric toaster comprising toast heating elements, a control switch therefor normally yieldingly biased to open position, a pivotally and rotatably mounted lever arm movable on its pivotal mounting to effect closing of said switch to initiate a toasting operation and a thermal timing means for terminating a toasting operation including a thermobar, means to cause heating of the thermobar, means including an adjustable stop member having a cam surface mechanically engageable by said thermobar when heated, to stop heating of the thermobar, said thermobar then cooling and causing termination of a toasting operation when it is has cooled to a predetermined low temperature, means normally biasing said stop member to a position to cause heating of the thermobar to stop when the thermobar has been heated to a predetermined high temperature, the improvement comprising means on said lever arm effective on rotative movement of said lever arm to cause movement of said stop member to a different position to stop heating of the thermobar at a different predetermined high temperature to thereby vary the duration of a toasting operation.

2. In an automatic electric toaster comprising toast heating elements, a control switch therefor normally yieldingly biased into open position, a pivotally and rotatably mounted lever arm movable on its pivotal mounting to effect closing of said switch to initiate a toasting operation and a thermal timing means for terminating a toasting operation including a thermobar, means to cause heating of the thermobar, means including an adjustable stop member having a cam surface mechanically engageable by said thermobar when heated, to stop heating of the thermobar, spring means normally biasing said stop member to a limiting position to cause heating of the thermobar to stop when the thermobar has been heated to a predetermined high temperature said thermobar then cooling and causing termination of a toasting operation when it has cooled to a predetermined low temperature, the improvement comprising a pivotally mounted arm adapted to engage said stop member and a cam disc fixedly secured on said lever arm and adapted to mechanically engage said pivotally mounted arm when said lever arm has been moved on its pivotal mounting to effect closing of said switch, rotative movement of said pivotally and rotatably mounted lever arm and of said cam disc causing movement of said stop member from its limiting position to cause heating of said thermobar to stop at a second predetermined high temperature to thereby vary the duration of a toasting operation.

3. In an automatic electric toaster comprising toast heating elements, a bread carrier movable relatively to said toast heating elements into toasting and non-toasting positions and normally yieldingly biased into non-toasting position, a pivotally and rotatably mounted lever arm movable on its pivotal mounting to effect movement of said carrier into toasting position, means to hold said carrier in toasting position and a thermal timing means for effecting release of said carrier to terminate a toasting operation including a thermobar, means to cause heating of the thermobar, means including an adjustable stop member having a cam surface mechanically engageable by said thermobar when heated, to stop heating of the thermobar, means normally biasing said stop member to a position to cause heating of the thermobar to cease when the thermobar has been heated to a predetermined high temperature, said thermobar then cooling and causing termination of a toasting operation when it has cooled to a predetermined low temperature, the improvement including a cam disc on said lever arm effective on rotative movement of said lever arm to cause movement of said stop member to a different position to cause heating of the thermobar to cease at a different predetermined high temperature to thereby vary the duration of a toasting operation.

4. In an automatic electric toaster comprising toast heating elements, a bread carrier movable relatively to the toast heating elements into toasting and non-toasting positions and normally yieldingly biased into non-toasting position, a pivotally and rotatably mounted lever arm movable on its pivotal mounting to effect movement of the carrier into toasting position, means to hold said carrier in toasting position and a thermal timing means for causing release of said carrier to terminate a toasting operation including a thermobar, means to cause heating of the thermobar, means including an adjustable stop member having a cam surface mechanically engageable by said thermobar when heated, to stop heating of the thermobar, means normally biasing said stop member to a position to cause heating of the thermobar to cease when the thermobar has been heated to a predetermined high temperature, said thermobar then cooling and causing release of said carrier when it has cooled to a predetermined low temperature, the improvement comprising a pivotally mounted arm adapted to engage and shift the stop member and a cam disc fixedly secured on said lever arm and adapted to mechanically engage said pivotally mounted arm when said lever arm has been moved on its pivotal mounting to move the carrier into toasting position, rotary movement of said pivotally and rotatably mounted lever arm and of said cam disc causing movement of said stop member from its limiting position to cause heating of said thermobar to cease at a second predetermined high temperature to thereby vary the duration of a toasting operation.

MURRAY IRELAND.